July 17, 1956　　　M. L. BENJAMIN ET AL　　　2,754,700
INDEX FIXTURE

Filed Dec. 13, 1954　　　　　　　　　　　　　2 Sheets-Sheet 2

INVENTORS
MILTON L. BENJAMIN AND
BY STANLEY S. BENJAMIN

Oberlin & Limbach
ATTORNEYS.

2,754,700
Patented July 17, 1956

2,754,700
INDEX FIXTURE

Milton L. Benjamin and Stanley S. Benjamin, Cleveland, Ohio, assignors to Erickson Tool Company, a corporation of Ohio Application December 13, 1954, Serial No. 474,670

10 Claims. (Cl. 74—822)

The present invention relates generally as indicated to an index fixture of the type adapted for use in connection with milling machines or the like for predeterminedly indexing a work piece to form a plurality of slots, holes, or the like therein, and embodies certain improvements over the index fixture disclosed in the Milton L. Benjamin et al. Patent No. 2,600,960, granted June 17, 1952, and over the index fixture disclosed in the copending application of Milton L. Benjamin, Serial No. 412,491, filed February 25, 1954.

It can be seen, by reference to the aforementioned patent, that, by reason of the use of a rack bar or the like engaged with a gear segment on the oscillating mechanism of the fixture and of the provision of a cam on the oscillating mechanism which is operative to hold a ratchet wheel locking plunger in its inoperative position during the return stroke of said mechanism, certain problems are encountered if it is desired to index the ratchet wheel and spindle through a relatively large angle such as, say, 120°.

In other words, the aforesaid cam would have to extend around the periphery of the ratchet wheel for at least 120° in one direction, and adjacent the cam, the oscillating driving pawl mechanism would have to click over the ratchet wheel for at least 120° in the opposite direction during the return stroke in order to advance the ratchet wheel a corresponding amount.

Accordingly, the oscillating mechanism and cam must extend circumferentially through an angle in excess of 240°; and, therefore, the aforesaid rack bar would have to be disposed to clear the end of the cam and the end of the driving pawl support portion of the oscillating mechanism. Thus, the gear segment would have to be enlarged in pitch diameter and the rack bar moved outwardly a corresponding distance, thereby unnecessarily enlarging the fixture housing. Another alternative would be to locate the gear segment and rack bar in a plane offset from the plane of the oscillating mechanism, but this expedient would axially enlarge the fixture housing.

Another problem encountered in connection with index fixtures generally is that the relatively heavy mass of the ratchet wheel, the spindle to which it is keyed, the chuck on the spindle, and the work piece mounted in the chuck tends to overrun the oscillating mechanism when it is attempted to rapidly index the same from one position to the next; and, of course, slow indexing cannot be tolerated, because of the extra time consumed thereby and consequent loss of production.

Accordingly, it is one principal object of this invention to provide a unique mechanism for preventing overrunning of the indexing assembly with respect to the pawl-operated mechanism therefor, whereby the indexing movements may be effected relatively rapidly.

It is another object of this invention to provide a simple form of indexing mechanism by means of which three-position-or 120° indexing is made possible without relocating the rack bar and enlarging or offsetting the gear segment of the oscillating mechanism as aforesaid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

Figure 1:
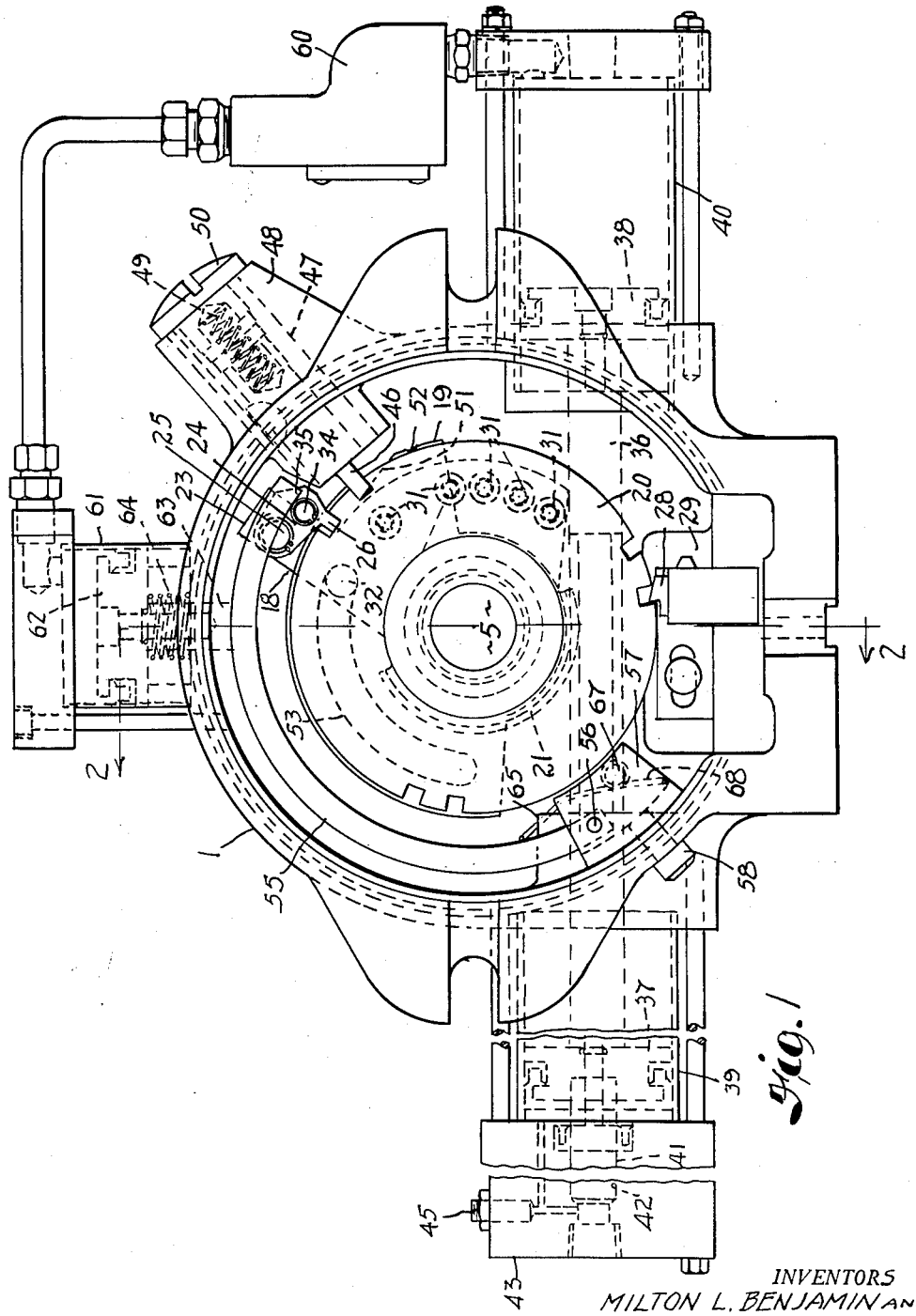
Fig. 1 is a rear elevation view of a preferred form of the present mechanism, the rear cover plate of the fixture housing having been removed to clearly illustrate the indexing mechanism parts contained in the housing.

Referring now more particularly to the drawings, the index fixture herein comprises a housing 1 formed with a rearwardly open recess 2 closed as by means of a cover plate 3 removably held in place as by means of the snap ring 4. Journalled in said housing is a spindle 5 which extends through a tapered roller bearing 6 or the like and through a sleeve bearing 7, whereby said spindle is freely rotatable but is securely held against axial and radial play.

Figure 2:
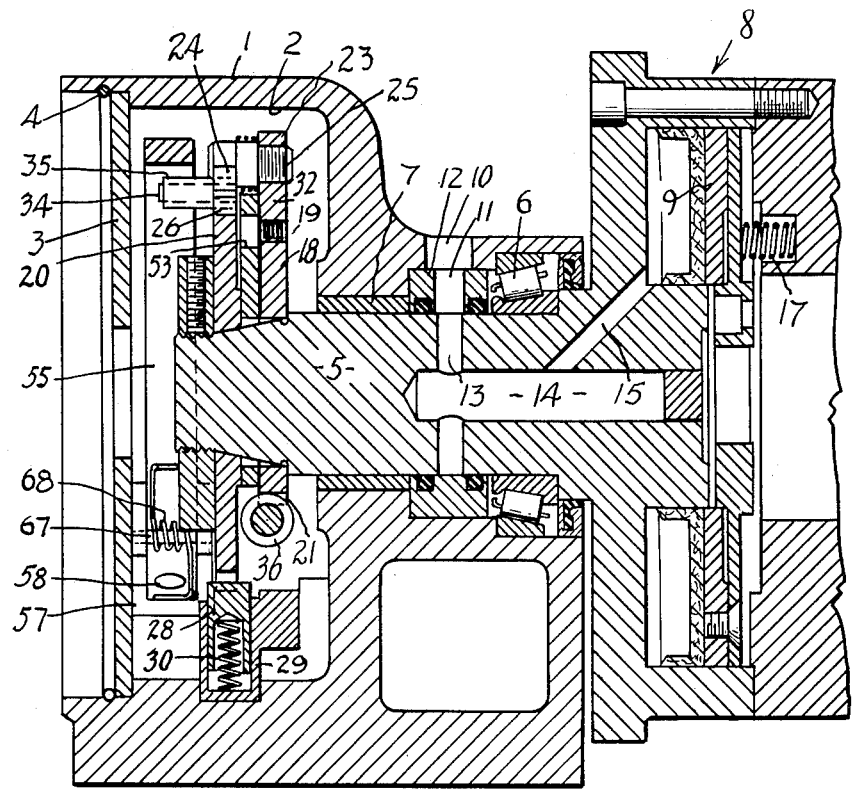
Fig. 2 is a cross-sectional view taken substantially along the line 2—2, Fig. 1.

The forward end of said spindle 5 is herein shown as embodying a pneumatic chuck structure 8 having a ring-like plunger 9 therein which is adapted to be actuated toward the right, as viewed in Fig. 2, under the influence of air pressure admitted through the port 10 of the housing, through the passage 11 of a manifold ring 12, thence through passages 13, 14, and 15 formed in the spindle itself. Such righthand movement of the piston 9 will be effective to actuate a chuck sleeve to contract a collet therewithin, said sleeve and collet not being shown herein, since these parts do not constitute any part of the present invention. Upon release of such air pressure, a series of springs 17 acting on the plunger 9 will move the latter toward the left to open the chuck.

The rear end of said spindle 5 is generally cylindrical (with tapered flats) on which a pawl support member 18 is journalled, a cam plate 19 is likewise journalled, and a ratchet wheel 20 is non-rotatably fixed thereto as by means of complementary interfitting flat surfaces formed in the ratchet wheel opening and the flats of the rear end portion of said spindle.

Figure 3:
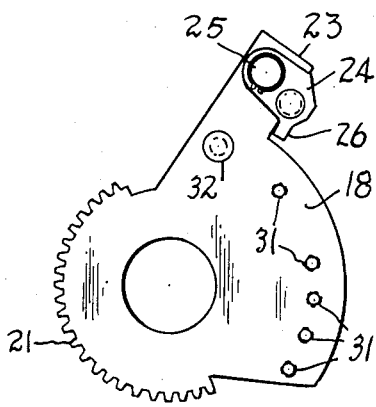
Fig. 3 is a rear elevation view of the oscillating driving pawl supporting members.

The pawl support member 18, as best shown in Fig. 3, is formed with a gear segment 21 and with a radially projecting lug 23 on which a driving pawl 24 is pivotally mounted on a pawl bolt 25, said driving pawl 24 having a radially inwardly extending tooth 26 which is adapted to be engaged in an interdental space between the teeth of the ratchet wheel 20.

A torsion spring 27 around said pawl bolt 25 has one axially directed end fitted into the hole in the pawl support member 18 and an opposite axially directed end similarly engaged in a hole in the pawl 24, said spring 27 being effective to swing the driving pawl 24 inwardly so that the end 26 thereof may engage in a tooth of the ratchet wheel 20.

When said pawl support member 18 is rotated in a counterclockwise direction as viewed in Figs. 1 and 3, said driving pawl 24 will click over the teeth of the ratchet wheel 20, and when member 18 is rotated in a clockwise direction, said pawl will engage in one of the interdental spaces between the teeth of the ratchet wheel to positively rotate the latter in a clockwise direction.

During the counter-clockwise rotation of the pawl-support member 18, the ratchet wheel 20 is held against movement therewith by means of the holding pawl 28 which is adjustably supported in a block 29 and which is pressed by the spring 30 toward and into engagement with the ratchet wheel, said holding pawl 28 being capable of clicking over the ratchet wheel teeth during the clockwise indexing movement of said ratchet wheel.

Said pawl support member 18 has threaded into one of the several holes 31 thereof a stop pin 32, the function of which will be described in detail later. Said driving pawl 24 also has a laterally projecting pin 34 carrying a rotatable sleeve 35 thereon, and the function of this will also be described in detail in a later portion of this specification.

The opposite rotary movements of the pawl support member 18 is effected by the annularly grooved rod 36 which is longitudinally reciprocable and which meshes with the teeth of the gear segment 21. Affixed to the opposite ends of said rod 36 are pistons 37 and 38 respectively reciprocable in single-acting cylinders 39 and 40; and, as evident, when air under pressure is admitted into the lefthand cylinder 39, Fig. 1, said rod 36 will move toward the right, exhausting the air from the righthand cylinder 40, and such righthand movement of the rod 36 will rotate the pawl support member 18 in a counter-clockwise direction.

Similarly, when air under pressure is admitted into the righthand cylinder 40, said rod 36 will be moved toward the left to thus rotate the pawl support member 18 in a clockwise direction, and preferably the piston 39 will be formed with a small piston extension 41 which, near the end of its lefthand stroke, will enter a small cylinder 42 formed in the cylinder head 43, and thus air will be trapped in the annular space between the small piston extension 41 and the cylinder 39 and can escape only through the relatively small-size aperture formed by the adjustable needle valve 45. In this way, the indexing movement will be effectively cushioned to avoid severe shock loads, particularly on the locking plunger 46 which will presently be described.

The locking plunger 46 is slidably keyed in a tapered bushing 47 which is fitted into a boss 48 formed in the housing 1, and a spring 49 compressed between said locking plunger, and a cap 50 screwed into the outer end of said bushing tends to urge the locking plunger radially inwardly to engage its inner end in an interdental space of the ratchet wheel 20 to thereby securely lock said ratchet wheel against movement from indexed position.

The opposite sides of the inner end of said locking plunger 46 may be slightly tapered so that said locking plunger will securely lock the ratchet wheel 20 in its indexed position by a wedging action in the interdental space. The inner end face of said locking plunger 46 is obliquely disposed, as shown, so that, as the ratchet wheel 20 approaches the desired indexed position, the leading side of said locking plunger will enter the notch of the ratchet wheel to a slight extent so as to abut the trailing side of the notch in the final indexed position and then finally "pop" fully into said notch. This feature is, of course, fully disclosed in the patent aforesaid and also in the copending application.

Figure 4:
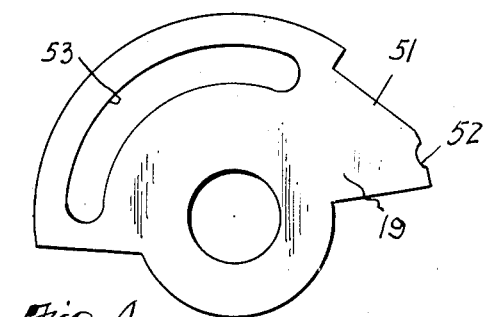
Fig. 4 is a similar rear elevation view of the locking plunger cam plate which in the final assembly is superimposed on said pawl supporting member and which is disposed between said pawl-supporting member and the pawl-actuated ratchet wheel.

Coming now to the cam plate 19, the same, as most clearly illustrated in Fig. 4 and which as aforesaid is located between the ratchet wheel 20 and the pawl support member 18 and is journalled on the spindle 5, has a cam surface 51. Upon counterclockwise rotation of said cam plate 19, said cam surface 51 engages the inner end of the locking plunger 46 and forces the latter radially outwardly out of engagement with the ratchet wheel notch.

Adjacent said cam surface 51 is a slight depression or groove 52, the bottom of which is at a diameter equal to that of the ratchet wheel 20 or slightly larger and in which groove the end of the locking plunger 46 is retained during a major portion of the forward indexing movement of the pawl support member 18 and ratchet wheel 20 driven thereby. Said cam plate 51 is also formed with an arcuate slot 53 coaxial with the ratchet wheel 20 and the pawl support member 18 and in which the head of the screw 32 is disposed.

In the position of the parts shown in Fig. 1, the cam surface 51 of said cam plate 19 has permitted the end of the locking plunger 46 to engage in a ratchet wheel notch adjacent the notch engaged by the driving pawl 24. As the pawl support member 18 is rotated in a counter-clockwise direction, the locking plunger 46 remains in the ratchet wheel notch owing to the lost motion between the pawl support member 18 and the cam plate 19 as afforded by the movement of the pawl support member screw 32 in the aforesaid arcuate slot 53 of said cam plate.

However, as the end of the return movement of the pawl support member 18 is approached, said screw 32 will engage one end of the slot 53, and thereafter the pawl support member 18 and cam plate 19 will move in unison in a counter-clockwise direction. Thus, the cam surface 51 will force the locking plunger 46 radially outwardly, and finally the end of the locking plunger will engage in the detent groove or depression 52 in the periphery of said cam plate 19.

The driving pawl 24 then is engaged in a new notch of the ratchet wheel 20, and when said pawl support member 18 is rotated in a clockwise direction, the ratchet wheel is driven by said driving pawl, and as the end of the indexing movement is approached, the screw 32 engages the other end of the arcuate slot 53, whereupon the pawl-support member 18 and said cam plate 19 rotate clockwise in unison. When the end of the locking plunger is opposite the notch adjacent that engaged by the driving pawl 24, it will "pop" into the locked position owing to the prior disengagement of the cam surface 51 therefrom. Just prior to thus popping in, the locking plunger end bears against the periphery of the ratchet wheel in readiness to engage in the next succeeding notch.

As previously mentioned, the pawl support member 18 is provided with a series of circularly arranged holes 31, into any one of which the screw 32 may be mounted; and, as evident, different indexing movements may be achieved according to which one of said holes the screw 32 is mounted in. This means, however, that the driving pawl 24, instead of always being engaged in a notch adjacent to the notch engaged by the locking plunger 46, will engage a different notch, and there may be one or more intervening notches between the driving pawl 24 and the locking plunger 46.

In the particular embodiment of the invention herein shown, the ratchet wheel 20 is shown as having only three pairs of notches spaced 120° apart, but it is to be understood that said ratchet wheel may have any desired number of notches. As shown, the pawl support member holes 31 are spaced apart for 90°, 60°, 45°, 30°, and 15° indexing using a twenty-four notch ratchet wheel 20.

Although the throttle valve 45 and trapped air chamber aforesaid cushion the clockwise rotation of the pawl support member 18 and of the ratchet wheel 20 driven thereby so as to reduce the stresses imposed on the locking plunger 46, there is the possibility, during rapid indexing movements, of the ratchet wheel spindle 5 and work piece carried in the chuck thereof overrunning the driving pawl 24.

In order to eliminate this possibility of overrunning, there is pivotally mounted in the housing 1 a curved rod 55, the pivot being provided by the pin 56 mounted in the U-shaped block 57. Said block 57 is held in the housing 1 as by a screw 58 passing through said housing and threaded into said block. Said rod 55 extends concentrically in spaced relation about the ratchet wheel 20, but axially offset therefrom, and the inner surface of said rod 55 is adapted to form a track engaged by the sleeve 35 on said pawl pin 34 projecting laterally from the swinging end of the driving pawl 24 radially opposite the pawl tooth 26.

When air under pressure is admitted into the righthand cylinder 40 to initiate the clockwise indexing movement of the pawl support member 18, the air pressure passes through the quick-exhaust valve 60 into the cylinder 61 at the top of the housing 1, thus forcing the piston 62 therein downwardly so that its radially inwardly projecting end 63 bears on the outside of said curved rod 55 and thus holds the curved rod in the concentric position shown so that the ratchet wheel 20 cannot overrun the pawl support member 18.

Now, when the air in the cylinder 40 is exhausted, the air in the top cylinder 61 is exhausted rapidly through the rapid exhaust valve 60, whereby the spring 64 forces the plunger 62 upwardly away from the curved rod. Then air under pressure admitted into the lefthand cylinder 39 will commence the return movement of the pawl support member 18 and the laterally projecting pin and sleeve 34 and 35 of the driving pawl 24 will force the curved rod to the position shown in dotted lines in Fig. 1, thus permitting the tooth 26 of the driving pawl 24 to become disengaged from the notch of the ratchet wheel 20 and to click over the teeth of the latter. The extent of return movement is determined by engagement of the member 18 with the stop shoulder 65 in housing 1.

The U-shaped block 57 has another pin 67 across the flanges thereof, and around said pin 67 is a torsion spring 68, one end of which bears on said block 57 and the other end of which bears on the curved rod 55 at a point spaced from the pivot axis thereof, and thus, by the combination of the spring force and the force of the pawl pin 34, the curved rod is swung to its inoperative, return movement permitting position.

Other modes of applying the principle of the invention may be employed, change being made as regards the details described, provided the features stated in any of the following claims, or the equivalent of such, be employed.

We therefore particularly point out and distinctly claim as our invention:

1. An index fixture comprising a housing, a ratchet wheel rotatably supported by said housing, oscillating means including a driving pawl arranged to click over the teeth of said wheel during rotation in one direction and to engage in an interdental space between adjacent teeth of said wheel during rotation in the opposite direction to thus positively drive said wheel in such opposite direction, a locking plunger having an inner end portion movable radially into and out of engagement with said wheel respectively to lock said wheel against rotation and to unlock said wheel for rotation from one indexed position to the next, a cam operated by said oscillating means for urging said plunger to wheel-unlocking position and for permitting said plunger to move to wheel-locking position, and releasable means in said housing to hold said driving pawl in engagement with said wheel during such opposite direction rotation and thus preclude overrunning of said wheel with respect to said oscillating means and to permit said driving pawl to click over said wheel during such one direction rotation of said oscillating means.

2. The index fixture of claim 1 wherein said releasable means comprises a curved rod concentrically disposed around a portion of said wheel, and rod-actuating means for moving said rod toward and away from said driving pawl.

3. The index fixture of claim 2 wherein said curved rod is pivotally connected at one end to said housing for swinging of the other end of said rod toward and away from said driving pawl.

4. The index fixture of claim 3 wherein said rod-actuating means comprises a fluid-actuated plunger engageable with such other end of said rod to urge the latter toward said driving pawl.

5. An index fixture comprising a housing, a ratchet wheel rotatably supported by said housing, oscillating means including a driving pawl adapted, during its opposite return and indexing strokes, respectively to click over the teeth of said wheel and to engage said wheel in unidirectional driving engagement to rotatably index the latter, and a curved rod member supported in said housing for movement toward said driving pawl to hold the latter in engagement with said wheel to thus prevent overrunning of said wheel with respect to said oscillating means during the indexing stroke and for movement away from said driving pawl to permit such clicking of said driving pawl over said wheel during the return stroke.

6. The index fixture of claim 5 wherein actuating means are provided to move said rod member as aforesaid.

7. The index fixture of claim 6 wherein said actuating means comprises a fluid-actuated plunger which engages said rod member and moves the same toward said driving pawl.

8. The index fixture of claim 7 wherein spring means acting on said plunger and on said rod member are effective to move the same away from said rod member and away from said driving pawl respectively upon release of fluid pressure on said plunger.

9. The index fixture of claim 7 wherein spring means acting on said plunger and on said rod member are effective to move the same away from said rod member and away from said driving pawl respectively upon release of fluid pressure on said plunger, said rod member being curved concentrically around a portion of said wheel to hold said driving pawl as aforesaid and having one end pivotally connected to said housing whereby said rod member is swung outwardly relative to said wheel to permit clicking of said driving pawl over said wheel.

10. An index fixture comprising a housing, a spindle journalled in said housing, a pawl support member journalled on said spindle and pivotally carrying a driving pawl, a cam plate also journalled on said spindle adjacent to said pawl support member and having a rotatable lost motion connection with the latter, a ratchet wheel non-rotatably keyed on said spindle adjacent to said cam plate and with which wheel said driving pawl has unidirectional driving engagement, a radially movable locking plunger engaged with said wheel to lock it against rotation, driving means for oscillating said pawl support member through opposite return and indexing strokes, said lost-motion connection being taken up near the ends of the strokes of said pawl support member whereby said cam plate is rotated by said pawl support member to respectively actuate said locking plunger out of and into engagement with said wheel, and a fluid pressure actuated member effective during the indexing stroke to hold the driving pawl in engagement with said wheel whereby overrunning of the latter and said spindle is prevented.

References Cited in the file of this patent
UNITED STATES PATENTS

| | | |
|---|---|---|
| 1,964,351 | Haas | June 26, 1934 |
| 2,600,960 | Benjamin | June 17, 1952 |
| 2,664,791 | Powell | Jan. 5, 1954 |